(12) United States Patent
Eckert

(10) Patent No.: US 10,279,788 B2
(45) Date of Patent: May 7, 2019

(54) METHOD FOR ADJUSTING BRAKE PRESSURES OF A MOTOR VEHICLE, BRAKE SYSTEM FOR CARRYING OUT THE METHOD AND MOTOR VEHICLE COMPRISING SUCH A BRAKE SYSTEM

(71) Applicant: WABCO GmbH, Hannover (DE)

(72) Inventor: Horst Eckert, Rehburg-Loccum (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 15/747,156

(22) PCT Filed: Jul. 22, 2016

(86) PCT No.: PCT/EP2016/001283
§ 371 (c)(1),
(2) Date: Jan. 24, 2018

(87) PCT Pub. No.: WO2017/050407
PCT Pub. Date: Mar. 30, 2017

(65) Prior Publication Data
US 2018/0215359 A1     Aug. 2, 2018

(30) Foreign Application Priority Data

Sep. 21, 2015   (DE) .................. 10 2015 012 378

(51) Int. Cl.
*B60T 8/32*     (2006.01)
*B60T 8/34*     (2006.01)
(Continued)

(52) U.S. Cl.
CPC ............. *B60T 8/327* (2013.01); *B60T 7/042* (2013.01); *B60T 7/12* (2013.01); *B60T 7/22* (2013.01);
(Continued)

(58) Field of Classification Search
None
See application file for complete search history.

(56) References Cited

U.S. PATENT DOCUMENTS 5,496,099 A * 3/1996 Resch ............... B60T 7/042
                                                303/113.4
5,586,814 A * 12/1996 Steiner ............... B60T 8/268
                                                303/113.1
(Continued)

FOREIGN PATENT DOCUMENTS

DE              19654427 A1    6/1998
DE           102009058154 A1    6/2011
(Continued)

*Primary Examiner* — Navid Ziaeianmehdizadeh
(74) *Attorney, Agent, or Firm* — Leydig, Voit & Mayer, Ltd.

(57) ABSTRACT

A method for adjusting brake pressures on pneumatically operated wheel brakes of a motor vehicle includes adjusting, in a normal braking mode, the brake pressures depending on a driver brake request; and adjusting, by a control unit in a pressure control mode, the brake pressures at the respective wheel brakes during reception of an external brake request, which is independent of the driver brake request and defined for the control unit as an external target deceleration value, as a function of a resulting target deceleration value of the vehicle deceleration. The control unit determines the resulting target deceleration value by linking the external target deceleration value according to the external brake request and a value corresponding to the driver brake request. A braking power index is determined which quantitatively represents the braking effect of the wheel brakes, and is provided to be taken into account in pressure control mode.

20 Claims, 3 Drawing Sheets

(51) Int. Cl.
*B60T 13/62* (2006.01)
*B60T 7/12* (2006.01)
*B60T 7/04* (2006.01)
*B60T 7/22* (2006.01)
*B60T 8/48* (2006.01)
*B60T 13/66* (2006.01)
*B60T 13/68* (2006.01)
*B60T 8/176* (2006.01)

(52) U.S. Cl.
CPC .............. *B60T 8/176* (2013.01); *B60T 8/342* (2013.01); *B60T 8/4818* (2013.01); *B60T 13/62* (2013.01); *B60T 13/662* (2013.01); *B60T 13/683* (2013.01); *B60T 8/323* (2013.01); *B60T 2201/022* (2013.01); *B60T 2270/10* (2013.01)

(56) References Cited

U.S. PATENT DOCUMENTS

| | | | | |
|---|---|---|---|---|
| 5,599,072 | A * | 2/1997 | Feldmann | B60T 8/00 303/113.4 |
| 5,887,954 | A * | 3/1999 | Steiner | B60T 7/042 303/113.4 |
| 6,081,761 | A * | 6/2000 | Harada | B60T 8/17554 701/72 |
| 6,086,167 | A | 7/2000 | Heckmann et al. | |
| 7,102,495 | B2 * | 9/2006 | Mattes | B60K 31/0008 180/276 |
| 7,234,786 | B2 * | 6/2007 | Mori | B60T 8/4872 303/11 |
| 7,416,263 | B2 * | 8/2008 | Schmitt | B60T 8/17555 303/11 |
| 8,714,663 | B2 * | 5/2014 | Maeda | B60L 15/2036 303/146 |
| 8,775,047 | B2 * | 7/2014 | Breuer | B60T 7/22 340/435 |
| 9,315,179 | B2 * | 4/2016 | Herges | B60T 8/1766 |
| 9,561,783 | B2 * | 2/2017 | Yamashita | B60T 7/22 |
| 2002/0010535 | A1 * | 1/2002 | Nishio | B60T 8/48 701/70 |
| 2002/0074854 | A1 * | 6/2002 | Fukasawa | B60T 8/4081 303/122 |
| 2002/0074855 | A1 * | 6/2002 | Beck | B60T 13/745 303/155 |
| 2004/0015283 | A1 * | 1/2004 | Eckert | B60T 8/00 701/70 |
| 2004/0041471 | A1 * | 3/2004 | Hellmann | B60K 31/0008 303/191 |
| 2005/0137773 | A1 * | 6/2005 | Goebels | B60R 16/0233 701/78 |
| 2007/0069578 | A1 * | 3/2007 | Hille | B60T 7/22 303/191 |
| 2008/0001476 | A1 * | 1/2008 | Franzke | B60T 7/108 303/177 |
| 2009/0230762 | A1 * | 9/2009 | Giers | B60T 7/042 303/3 |
| 2009/0273231 | A1 * | 11/2009 | Knechtges | B60T 7/12 303/167 |
| 2010/0019565 | A1 * | 1/2010 | Broch | B60T 8/1708 303/7 |
| 2011/0178688 | A1 * | 7/2011 | Knechtges | B60T 8/3275 701/70 |
| 2011/0193407 | A1 * | 8/2011 | Wohltmann | B60T 8/327 303/139 |
| 2012/0203438 | A1 | 8/2012 | Breuer et al. | |
| 2013/0184957 | A1 * | 7/2013 | Herges | B60T 7/20 701/76 |
| 2014/0117750 | A1 * | 5/2014 | McCann | B60T 8/885 303/119.1 |
| 2015/0019101 | A1 * | 1/2015 | Bajorat | B60T 7/085 701/71 |
| 2018/0072288 | A1 * | 3/2018 | Boethel | B60T 8/1708 |

FOREIGN PATENT DOCUMENTS

| | | |
|---|---|---|
| KR | 20030013748 A | 2/2003 |
| WO | WO 9813239 A1 | 4/1998 |
| WO | WO 9906809 A1 | 2/1999 |

* cited by examiner

METHOD FOR ADJUSTING BRAKE PRESSURES OF A MOTOR VEHICLE, BRAKE SYSTEM FOR CARRYING OUT THE METHOD AND MOTOR VEHICLE COMPRISING SUCH A BRAKE SYSTEM

CROSS REFERENCE TO RELATED APPLICATIONS

This application is a U.S. National Stage Application under 35 U.S.C. § 371 of International Application No. PCT/EP2016/001283 filed on Jul. 22, 2016, and claims benefit to German Patent Application No. DE 10 2015 012 378.5 filed on Sep. 21, 2015. The International Application was published in German on Mar. 30, 2017 as WO 2017/050407 A1 under PCT Article 21(2).

FIELD

The invention concerns a method for adjusting brake pressures on pneumatically operated wheel brakes of a motor vehicle. The invention also concerns a brake system of a motor vehicle for adjusting brake pressures on pneumatically operated wheel brakes, and a motor vehicle with such a brake system.

BACKGROUND

To brake a motor vehicle, the wheels of the motor vehicle are braked. In trucks in particular, respective brake cylinders are assigned to the wheel brakes of the wheels, wherein the necessary brake pressure is usually generated pneumatically. If the driver of the vehicle requests a braking via a brake pedal, in normal braking mode, the brake pressure is set depending on the driver brake request. In known brake systems, often a service brake valve is activated by means of the brake pedal, and manages the supply to the brake cylinders from a pressure medium store.

As an alternative to normal braking mode, the brake pressure is set by a control unit at the respective wheel brakes according to the specifications from the control unit. DE 10 2009 058 154 A1 discloses such a brake system, the control unit of which in pressure control mode sets the necessary brake pressures when corresponding braking needs are established. Such braking needs may for example be antilock braking interventions if a braking need is established at specific wheels. The known brake system also takes into account external brake requests, for example from a driver assistance system. Driver assistance systems, as systems executed separately from the control unit, send signals according to the external brake request to the control device of the brake system, for example via a databus. In this way, in pressure control mode, an external target deceleration value is predefined for the control unit, i.e. a value which represents the deceleration of the motor vehicle desired by the driver assistance system. If in pressure control mode, both external brake requests and also a driver brake request occur, i.e. the driver brakes in addition to the external brake request, the control unit adjusts the brake pressure at the respective wheel brakes according to a resulting target deceleration value of the vehicle deceleration. The control unit determines the resulting target deceleration value by linking the external target deceleration value according to the external brake request and a variable corresponding to the driver brake request.

In the known brake system, the driver brake request and the external brake request are executed additively. Alternatively, in the known brake system, in a "maximum" mode, the control unit forms only the maximum value of the target deceleration values already requested internally by the brake system and the external target deceleration values, wherein the external brake request is set only if it is higher than the internal brake request. By linking the external brake request and the driver brake request into a resulting brake pressure, it is ensured that an external brake request is set in pressure control mode even in the absence of a driver brake request.

SUMMARY

In an embodiment, the present invention provides a method for adjusting brake pressures on pneumatically operated wheel brakes of a motor vehicle. The method includes adjusting, in a normal braking mode, the brake pressures depending on a driver brake request; and adjusting, by a control unit in a pressure control mode, the brake pressures at the respective wheel brakes during reception of an external brake request, which is independent of the driver brake request and defined for the control unit as an external target deceleration value, as a function of a resulting target deceleration value of the vehicle deceleration. The control unit determines the resulting target deceleration value by linking the external target deceleration value according to the external brake request and a value corresponding to the driver brake request. In normal braking mode, taking into account the value corresponding to the driver brake request and a measured or determined actual deceleration value of the vehicle deceleration, a braking power index is determined which quantitatively represents the braking effect of the wheel brakes, and provided to be taken into account in pressure control mode, wherein in pressure control mode, the provided braking power index is linked to the value of the driver brake request.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
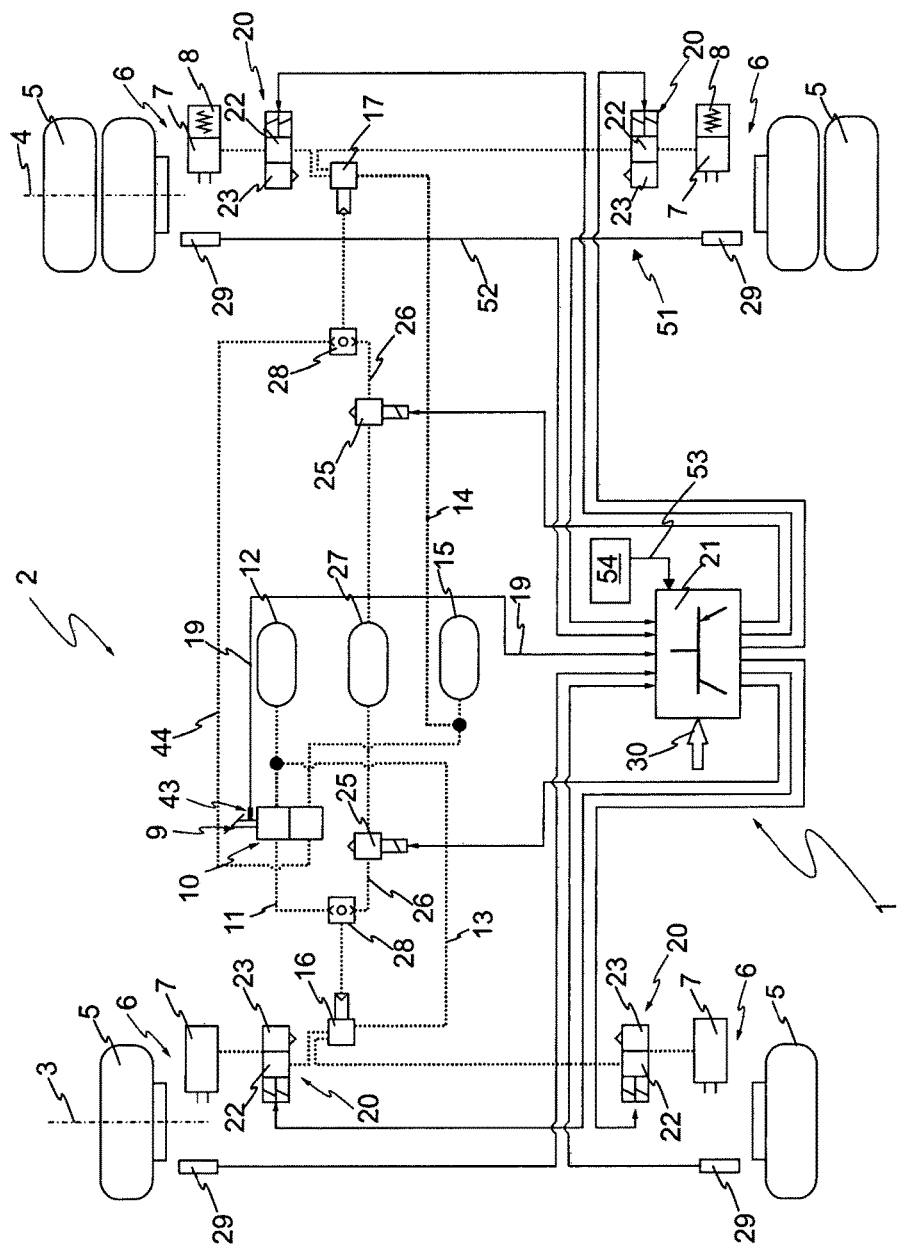
FIG. 1 is a pneumatic and electrical diagram of a brake system of a truck.

In pressure control mode, with a combination of external brake request and driver brake request, often undesirable jerk phenomena occur. Embodiments of the invention provide for a smooth and constant braking behaviour of the motor vehicle when setting the brake pressure in a pressure control mode with external brake request and additional driver brake request.

According to embodiments of the invention, in normal braking mode, taking into account the value of the driver brake request, input into the control unit, of at least one braking by the driver of a motor vehicle, and a measured or determined actual deceleration value of the vehicle deceleration, a braking power index is determined which quantitatively represents a braking effect of the wheel brakes. Brake systems according to embodiments of the invention include means for determining the actual deceleration value of the vehicle deceleration, namely an acceleration sensor in one advantageous embodiment. In a further advantageous embodiment, the actual deceleration value is determined by analysis of signals from rotation speed sensors of the wheel brakes. The braking power index determined characterizes the braking effect of the wheel brakes on the motor vehicle in the respective braking, and in its quantitative information takes account of all variables influencing the braking behaviour of the motor vehicle and the performance, i.e. in particular the efficiency, of the brake system. By determining the braking power index, variables influencing the braking behaviour but difficult to detect are taken into account, for example the load state of the vehicle or changes in the friction coefficient of the friction partners of the wheel brakes, namely brake discs or brake drums on one side and brake pads of the wheel brakes on the other, due to a changed, in particular high, temperature level of the friction partners. Also, by determining the braking power index and taking this into account in the control of brake pressure, the influence of the roadway slope, i.e. the influence of an uphill or downhill gradient, is taken into account In an advantageous embodiment, the influence of the roadway slope at the start of braking is detected as an offset value and worked out or taken into account accordingly in determination of the braking power index.

Unsteady braking behaviour or even undesirable jerking of the vehicle, in driving situations with combined driver brake request and external brake request, is often attributable to the fact that the actual deceleration occurring deviates greatly from the target deceleration determined.

According to embodiments of the invention, in pressure control mode, the braking power index learned and provided in normal braking mode is linked to the value of the driver brake request, changes in the performance of the brake system because of changeable circumstances, such as a changed load state or changed fiction coefficient of the friction partners of the wheel brakes, can be compensated for. Because of this, the deviation of the actual vehicle acceleration from the target vehicle acceleration, which is compensated by control of brake pressure, is reduced.

The braking power index is a relative index which takes account of the value of the driver brake request and the actual deceleration. Depending on the design of the brake system, and in particular the evaluation of the driver brake request, the braking power index is determined as having a dimension or being dimensionless.

Accordingly, to improve the braking behaviour in pressure control mode with a combination of an external brake request and the driver brake request, embodiments of the invention propose the learning of the braking power index which characterizes the performance of the wheel brakes, i.e. in particular their efficiency. In normal braking mode, the braking power index has no effect on the setting of the brake pressure, but is learned exclusively to take into account the driving situation and the vehicle characteristics, and is provided for pressure control mode.

In an advantageous embodiment of the invention, the braking power index is determined in that, on a braking, as a function of a predefined conversion specification, a driver target deceleration value of the vehicle deceleration corresponding to the driver brake request is determined and set in relation to the actual deceleration value of the vehicle deceleration. The conversion specification is determined in advance and implemented in the control unit or made available to the control unit.

Since the conversion specification takes account of driver target deceleration values corresponding to the driver brake request in the same dimension as the external brake request, when the braking power index learned in normal braking mode is later taken into account in pressure control mode, determination of the driver target deceleration value is simplified. This reduces conversion processes to a minimum. Both the driver deceleration value and the external brake request are present in the same physical units, namely the dimension of deceleration (negative acceleration), and can therefore be linked together without further calculation steps.

Advantageously, the braking power index is taken as a quotient of the driver target deceleration value and of the actual deceleration value, so that direct conclusions and links are possible. A value of the braking power index less than 1 allows the conclusion that the braking effect of the wheel brakes is better than was expected when the conversion specification was determined. If the braking power index is greater than 1, the performance of the brake system is worse than was expected in advance when the conversion specification was determined.

In an advantageous embodiment, the conversion specification predefined for the control unit comprises a predetermined reference value of the driver brake request, or the physical unit in which the driver brake request is notified to the control unit, and a reference deceleration value linked to the reference value. As the driver deceleration value which forms the basis for determining the braking power index, a proportion of the predefined reference deceleration value is determined which corresponds to a proportion of the value of the driver brake request relative to the reference value of the driver brake request. Preferably, the percentage value of the proportion of the reference deceleration value which determines the size of the driver target deceleration value is taken as equal to the predefined proportion of the reference value of the driver brake request. The conversion specification is a predefined conversion axiom in which key values of a scale are assumed, namely firstly zero and secondly the key point provided as the reference value or reference deceleration value. All proportions of the reference deceleration value thus form a relative scale, wherein a corresponding proportion of the driver brake request is assigned to each proportion of the relative scale. For example, as an axiom for the conversion specification, a reference deceleration value of 1 g (approximately 10 m/s$^2$) may be linked to the reference value of the driver brake request, so that with the conversion axiom it is assumed that a driver brake request of 100% causes a brake deceleration of 100% g (10 m/s$^2$). According to a relative scale, therefore, a driver brake request of 0% causes a brake deceleration of 0% g. With such a conversion specification based on a conversion axiom with linking of a reference deceleration value and predefined reference values of the driver brake request, a specific proportion of the reference deceleration can be assigned to every value of the driver brake request.

Advantageously, with the conversion specification, a specific proportion of the reference value of the driver brake request is assigned to each value of the driver brake request, and linked to proportionally corresponding amounts of brake deceleration. If for example the driver brake request is input into the control unit in the dimension of pressure, for example a proportion of 20% of the reference value of the driver brake request may be assigned to a pressure of 2.0 bar. If, in operation of the vehicle, the actual deceleration value measured or determined amounts for example to 30% g, the quotient of the driver target deceleration value and actual deceleration value gives 20% g/30% g=0.66 as a braking power index.

According to a preferred embodiment of the invention, a driver target deceleration value corresponding to the driver brake request is determined and linked to the braking power index in pressure control mode. Advantageously, the driver target deceleration value in pressure control mode is determined from a value representing the driver brake request, for example a pressure value or a percentage driver brake request established using the predefined conversion specification. In other words, after reading the driver brake request, the control unit determines the driver target deceleration value in the opposite direction to the procedure for determining the braking power index during normal braking mode. In this case, the driver brake request is linked to the provided braking power index, wherein the result is a driver target deceleration value in the dimension of deceleration (i.e. negative acceleration). An improved adaptation of the performance of the brake system during operation of the motor vehicle, taking into account the external influences on the motor vehicle affecting performance, is achieved if current values of the braking power index are determined for each further braking in normal braking mode. The braking power index provided for the pressure control mode is adapted from braking to braking taking into account the current value of the braking power index, and hence becomes increasingly more precise, refined and informative.

If, according to an embodiment of the invention, both the driver brake request and the external brake request are determined in the dimension of deceleration and linked together, in a particularly preferred embodiment the actual deceleration value is regulated using the resulting target deceleration value as the command variable. Brake systems according to embodiments of the invention here has a regulation circuit for setting the actual deceleration value, wherein in the regulation circuit, the actual deceleration value is the controlled variable, the resulting target deceleration value is the command variable, and the brake pressure is the correcting variable. By varying the brake pressure, the actual deceleration value is adjusted to the target deceleration value, so that the brake pressure is set optimally by regulation of the actual deceleration.

In a preferred embodiment of a brake system according to the invention, the control unit is part of an anti-lock braking system and evaluates dynamic state variables of the wheels to be braked. If one or more wheels show a blocking tendency, the control unit controls or regulates the brake pressure of the wheel brakes concerned in pressure control mode. Intervention measures of the anti-lock braking system can thus be designated as internal brake requests, which the control unit itself determines on the basis of the duration of supplied measured values of the dynamic state variables of the wheels to be braked, and where necessary adapts the brake pressure at specific wheel brakes in pressure control mode. Pressure control mode is an operating mode in which the control unit actively influences the brake pressure. According to embodiments of the invention, the brake pressure is used both for intervention measures of the anti-lock braking system and for the actuation of external brake requests, e.g. emergency braking.

The actual deceleration value, determined for the definition of a braking power index according to embodiments of the invention, is determined by the control unit from measured dynamic state variables of the wheels to be braked. The measurements of the dynamic state variables are also evaluated by the control unit for the anti-lock braking function. In a further advantageous embodiment, also changes in roadway slope are taken into account and their influence on the determination of the braking power index reduced, in that the actual deceleration value is determined on the basis of dynamic state variables and the measurement signal from a longitudinal acceleration sensor. When both signals are present, it is easily possible to detect a roadway slope which changes during a braking.

The control unit controls the brake pressure in pressure control mode via a pressure control valve of the respective wheel brake. The brake circuits of the pressure control valves can be connected to a pressure medium store by activation of a respective actuation valve per brake circuit. The actuation valves are here switched by the control unit. At the end of pressure control mode, the actuation valve of the brake circuit concerned is brought by the control unit to the closed position, whereby the connection of the connected pressure control valves to the pressure medium store is separated. In normal braking mode, the brake pressure at the wheel brakes can be influenced only depending on the driver brake request, namely in particular via a service brake valve, the position of which can be changed by the driver of the motor vehicle by means of a drive pedal in the driver's cab.

The actuation valves are advantageously configured as 3/2-way directional control valves, whereby the pressure line behind the actuation valve can be purged if required.

The arrangement of the actuation valves in the respective brake circuits allows an immediate termination of the pressure control mode by separation of the pressure control valves from the respective pressure medium store, so that it is possible to switch rapidly from pressure control mode to normal braking mode.

Embodiments of the invention are advantageous in particular in motor vehicles which are equipped with pneumatically operable wheel brakes. Embodiments of the invention can be used preferably in trucks and vehicle combinations with a tractor vehicle and one or more trailer vehicles.

FIG. 1 shows an electric-pneumatic diagram of a brake system 1 of a motor vehicle 2, in particular a truck. Electrical lines are depicted with solid lines, and pneumatic lines with dotted lines. The motor vehicle 2 in the exemplary embodiment shown comprises two axles, namely a front axle 3 and a rear axle 4, on which wheels 5 are arranged on both sides. To brake the wheels 5, a wheel brake 6 is assigned to each wheel 5. The wheel brakes 6 can be activated pneumatically and each have a brake cylinder 7. The wheel brakes 6 exert a brake force on the rotating wheel 5 according to the pneumatic brake pressure present in the respective brake cylinder 7. Brake cylinders 7 with spring accumulators 8 are provided on the wheels 5 of the rear axle 4 and serve as a parking brake.

A brake pedal 9, which is coupled to a service brake valve 10, is arranged In the driver's cab of the motor vehicle 2. The driver of the motor vehicle 2, by actuating the brake pedal 9, can switch pneumatic pressure through to the brake cylinders 7 and hence actuate the wheel brakes 6. For this, the service brake valve 10 controls pneumatic brake lines 11, 44 between the pressure medium stores 12, 15 and the brake cylinders 7.

In the exemplary embodiment shown, the wheel brakes 6 of the front axle 3 are assigned to a common first brake circuit 13, while the wheel brakes 6 of the rear axle 4 can be actuated by a second brake circuit 14. The first pressure medium store 12 is here assigned to the first brake circuit 13 and connected to the brake cylinders 7 of the front axle 3 by the brake line 11. The second brake circuit 14 of the rear axle 4 is supplied with pressure medium via a second pressure medium store 15. The second brake circuit 14 is structured similarly to the first brake circuit 13, i.e. the brake line 44 between the second pressure medium store 15 and the wheel brakes 6 of the rear axle 4 can be opened via the service brake valve 10 and hence the brake pressure can be set depending on the position of the brake pedal 9.

A pneumatically actuatable relay valve 16 is arranged in the first brake circuit 13, and similarly a relay valve 17 is arranged in the second brake circuit 14. The pneumatically actuatable relay valves 16, 17 are opened via the pneumatic pressure from the respective connected pressure medium store 12, 15. If the service brake valve 10 is opened, the relay valves 16, 17 switch the brake pressure present through to the connected wheel brakes 6. In a normal braking mode (reference sign 18 in FIG. 2), the brake pressure in the wheel brakes 6 can be set depending on the driver brake request (reference sign 19 in FIG. 2). In normal brake mode 18 therefore, the driver of the motor vehicle 2 has, via actuation of the brake pedal 9, full control over the braking behaviour of the motor vehicle 2.

A pressure control valve 20 is assigned to each wheel brake 6 of the brake system 1, and is activated electrically by the control unit 21. The pressure control valves 20 of the wheel brakes 6 of the front axle 3 are arranged in the first brake circuit 13, and the pressure control valves 20 of the rear axle 4 are arranged in the second brake circuit 14. The pressure control valves 20 are each a combination of at least two magnetic valves, namely an inlet valve 22 and an outlet valve 23. The inlet valve 22 serves in principle to increase the pressure or maintain the pressure in the brake cylinder 7, while the outlet valve 23 is opened to reduce the brake pressure and purge the respective connected brake cylinder 7. In the exemplary embodiment, the inlet valve 22 and the outlet valve 23 are 2/2-way directional control valves which can be actuated electrically by the control unit 21. In normal braking mode 18, the inlet valves 22 are switched into the open position and the outlet valves 23 into the closed position, so the brake pressure is switched through.

Figure 2:
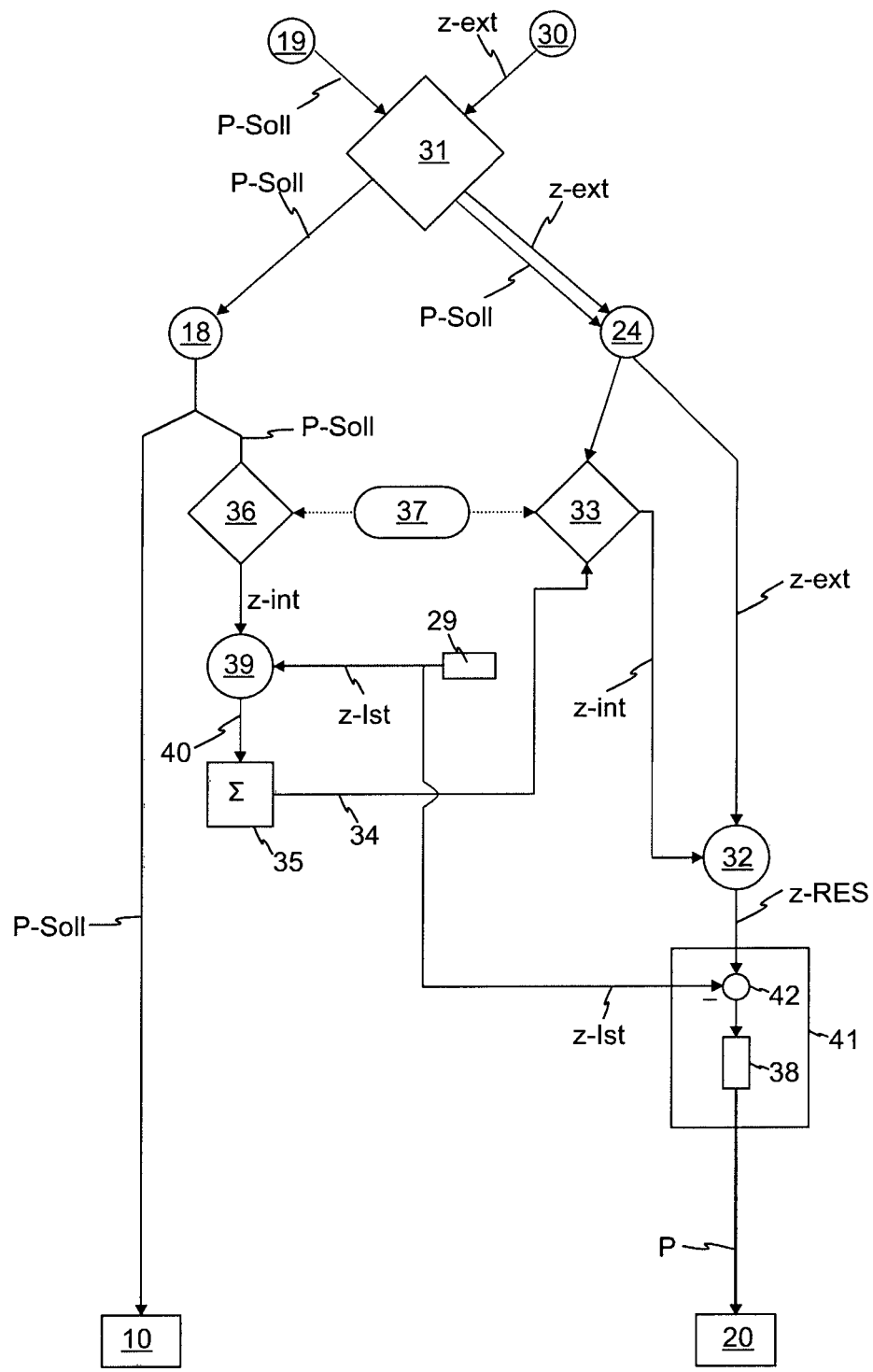
FIG. 2 is a flow diagram of a method for setting the brake pressures in a brake system.

The pressure control valves 20 are actuated by the control unit 21 in a pressure control mode (reference sign 24 in FIG. 2). In pressure control mode 24, the control unit 21 performs the adjustment of the brake pressure of the respective wheel brakes 6 by corresponding actuation of the pressure control valves 20. An electrically operable actuation valve 25 is assigned to each brake circuit 13, 14, and can be actuated by the control unit 21. Each actuation valve 25 is configured as a 3/2-way directional control valve, whereby the pressure line behind the actuation valve can be purged if required. In pressure control mode 24, by control of the actuation valves 25, brake pressure can be switched through to the pressure control valves 20. In the exemplary embodiment shown, the actuation valves 25 each control a pressure line 26 from a third pressure medium store 27 to the relay valves 16, 17. By operation of the actuation valves 25 of the first brake circuit 13, the relay valve 16 of the front axle 3 can thus be actuated. Similarly, the relay valve 17 of the rear axle 4 is actuated by operation of the actuation valve 25 of the second brake circuit 14.

The service brake valve 10 and the actuation valves 25 are each coupled via a twin check valve 28 to the pneumatic control input of the relay valve 16, 17 of the respective brake circuit 13, 14.

The control unit 21 is here formed and configured to act autonomously on the brake process in pressure control mode 24, independently of the driver brake request 19. For this, the control unit 21 determines a specific target brake pressure and inputs this target brake pressure at the respective wheel brakes 6 by actuation of the pressure control valves 22. The decision on a braking action and determination of the corresponding target brake pressure is made by the control unit 21 on the basis of the information supplied to it.

The brake system 1 comprises an anti-lock braking system 51, the essential elements of which are the control unit 21 and sensors for determining the blocking tendency of the wheels 5. The determined dynamic state variables 52 of the wheels 5 are continuously supplied to the control unit 21. For this, a rotation speed sensor 29 is assigned to each wheel 5, the measurement signals from which are sent to the control unit 21. When a blocking tendency is detected in one or more wheels, the anti-lock braking system, via the control unit 21, intervenes in the braking process by controlling the brake pressure at the respective wheel brake 6 in pressure control mode 24.

By adjusting the brake pressures in pressure control mode 24, the control unit 21 is implementing not only internal brake requests, which are predefined on the basis of the dynamic state variables of the vehicle supplied to it, but also external brake requests 30. The external brake request 30 is predefined by a driver assistance system. An external brake request 30 is a request for braking power from one or more driver assistance systems or other external systems which request a braking manoeuvre as a result of their function in the motor vehicle 2. On receipt of an external brake request 30, the control unit 21 switches from normal braking mode 18 to pressure control mode 24, and performs the control or regulation of the brake pressures at the individual wheels 5.

If the external brake request 30 is revoked, i.e. the control unit 21 no longer receives an external brake request 25, the control unit 21 initiates a termination of the pressure control mode 24 provided that no driver brake request 19 has been issued, i.e. as long as the driver is not also braking. This situation is explained in more detail below with reference to FIG. 2. By termination of pressure control mode 24, the driver of the motor vehicle 2 thus resumes complete control of the actuation of the wheel brakes 6 in normal braking mode 18.

The brake system 1 comprises a brake signal emitter 43 which is connected to the control unit 21 so as to transmit signals. The output signal of the brake signal emitter 43 quantitatively corresponds to the driver brake request 19, wherein for example the position or an actuation travel of the brake pedal 9, an actuation travel of a component of the service brake valve 10, or a brake pressure triggered by the service brake valve 10 may be measured. The driver brake request 19 is notified to the control unit 21 via the signal-transmitting connection. Thus the control unit 21 is able, in pressure control mode 24, to take account of an additional braking of the driver, i.e. an additional driver brake request 19 occurring simultaneously with the external brake request 30. In pressure control mode 24, the output signal from the brake signal emitter 43 gives the control unit the value P-Soll (FIG. 2) with quantitative information on the driver brake request 19. In the exemplary embodiment in FIG. 2, a target pressure is predefined as value P-Soll of the driver brake request 19 for the control unit 21.

The control unit 21 takes account both of the driver brake request 19 and the external brake request 30 in a method for determining the brake pressure which is described below with reference to FIG. 2.

In normal braking mode 18, the brake pressure is always set purely depending on the driver brake request 19. The driver brake request 19 is notified to the control unit 21 (FIG. 1) by a value representing the driver brake request 19. In the exemplary embodiment shown, the value is predefined as a target brake pressure P-Soll to be set. In normal braking mode 18, the brake system sets this corresponding to the actuation of the service brake valve 10 (FIG. 1). If the control unit 21 receives an external brake request 30, it switches to pressure control mode 24. For this, in a mode detection step 31, the control unit 21 detects the brake requests to be taken into account, namely the driver brake request 19 and the external brake request 30. If there is no external brake request 30, the brake pressure at the wheel brakes is set according to the target brake pressure (value P-Soll). In normal braking mode, the inlet valves 22 of the pressure control valves 20 remain open and the outlet valves 23 remain closed, whereby the driver of the motor vehicle 2 has full control over the braking manoeuvre.

If the control unit 21 receives an external brake request 30, in pressure control mode 24, the control unit 21 sets a brake pressure P at the wheel brakes 6 taking into account the external brake request 30 and any simultaneous driver brake request 19. If both an external brake request 30 and a driver brake request 19 are present, for example if the driver brakes additionally during pressure control mode 24, the control unit determines the brake pressure P to be set by linking the driver brake request 19 and the external brake request 30. For this a linking element 32 is provided.

The external brake request 30 is predefined for the control unit 21 as an external target deceleration value z-ext. To link the external target deceleration value z-ext to the driver brake request 19, the value P-Soll of the driver brake request 19 is converted into a driver target deceleration value z-int with the dimension of deceleration. The driver deceleration value z-int of the vehicle deceleration is linked—in this exemplary embodiment additively—to the external target deceleration value z-ext by the linking element 32, forming a resulting target deceleration value z-RES. Conversion of the value of the driver brake request 19 into a corresponding driver target deceleration value z-int takes place in a conversion step 33 in a manner to be explained below.

In normal braking mode 18, taking into account the value P-Soll of the driver brake request 19 during a braking, i.e. the target brake pressure preset by the driver, and a measured or determined actual deceleration value z-Ist of the vehicle deceleration, a braking power index 34 is determined which quantitatively represents a braking effect of the wheel brakes. The control unit 21 determines the actual deceleration value z-Ist of the vehicle deceleration by analysis of the dynamic state variables 52 of the wheels 5 to be braked. In the exemplary embodiment shown, a longitudinal acceleration sensor 54 is also assigned to the control unit 21, the measurement signal 53 from which is entered in the control unit 21. The control unit 21 determines the actual deceleration value z-Ist on the basis of the dynamic state variables 52 and the measurement signal 53 of the longitudinal acceleration sensor 54, so that changes in roadway slope during a braking manoeuvre are taken into account in determination of the braking power index 34.

The braking power index 34 is determined in a determination step 36, in that on a braking, following a predefined conversion specification 37, a driver target deceleration value z-int corresponding to the driver brake request 19 is determined and set in relation to a measured or determined actual deceleration value z-Ist. The actual deceleration value z-Ist may be provided by a longitudinal acceleration sensor (not shown) of the brake system 1 (FIG. 1). Alternatively, the actual deceleration value z-Ist is determined from the sensor signals of the rotation speed sensors 29.

Figure 3:
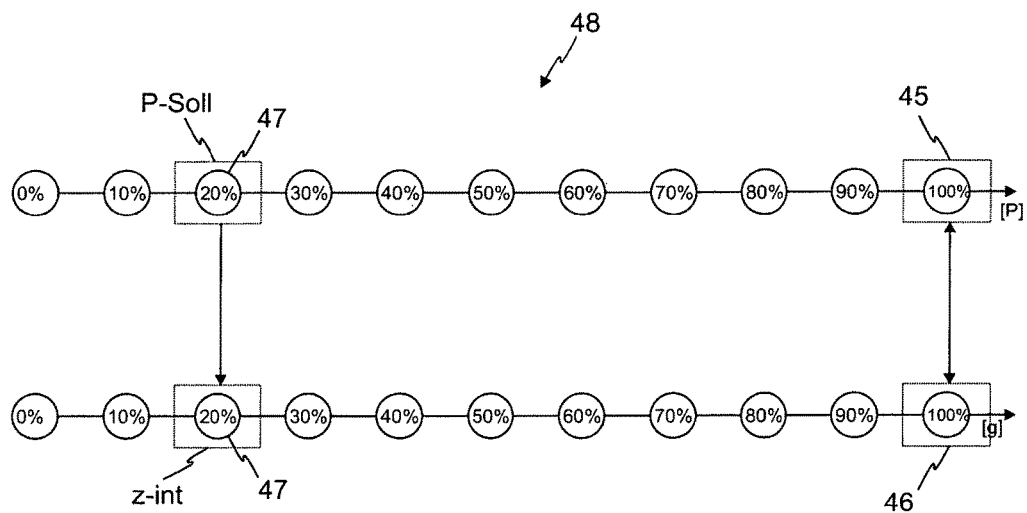
FIG. 3 is an assignment diagram for determining a target deceleration value from an assignment specification.
Figure 4:
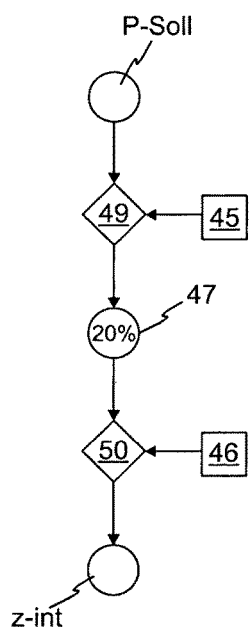
FIG. 4 is a flow diagram determining a target deceleration value according to FIG. 3.

An exemplary embodiment for determining the driver target deceleration value z-int using the predefined conversion specification 37 is explained below with reference to FIG. 3 and FIG. 4. The conversion specification 37 comprises a predetermined reference value 45 of the driver brake request 19 and a reference deceleration value 46 linked thereto, and a proportion 47 of the assumed reference deceleration value 46 is determined as the driver target deceleration value z-int and assigned to the corresponding proportion of the driver brake request 19 at the reference value 45 of the driver brake request 19. The conversion specification 37 here defines a conversion axiom. For example, it may be assumed that a driver brake request 19 with a reference value 45 of 100% causes a vehicle deceleration with a reference deceleration value 46 of 100% g (10 m/s$^2$). The reference value 45 of the driver brake request 19 and the associated reference deceleration value 46 form the reference point on a relative scale in which, for a driver brake request of 0%, an effective vehicle deceleration of 0% g is assumed.

With the resulting definition in the sense of a conversion axiom, in the conversion specification 37, a specific proportion 47 of the reference value 45 of the driver brake request 19, i.e. a corresponding percentage, is assigned to each value (brake target pressure P-Soll) of the driver brake request 19, and linked with proportionally corresponding amounts of the reference deceleration 46. The value of the percentage proportion 47 of the reference deceleration value 46, which determines the size of the driver target deceleration value, is taken as equal to the predefined proportion 47 of the reference value 45 of the driver brake request 19. If the driver brake request is predefined with the physical unit of pressure, namely here a target brake pressure, by division 49 of the current value P-Soll of the target brake pressure by the reference value 45, a specific proportion 47 of the reference value 45 of the driver brake request is assigned to each value P-Soll requested by the driver. If for example a proportion 47 of 20% of the reference value 45 of the driver brake request is determined, for example with a target brake pressure of 2.0 bar, in a linking 50 of the proportion 47 with the reference deceleration value 46 corresponding to the definition of the conversion specification 37, a driver target deceleration value z-int is determined with the dimension 20% g (approximately 2 m/s$^2$).

In an index determination step 39, a current value 40 of the braking power index 34 is determined, in that the driver target deceleration value z-int is set in relation to the measured actual deceleration value z-Ist. The braking power index 34 is here taken as a quotient of the driver target deceleration value z-int and the actual deceleration value z-Ist. If the measured actual deceleration value z-Ist amounts for example to 30% g, in the index determination step 39, a braking power index 34 results from the driver target deceleration value z-int (20% g)/actual deceleration value (30% g)=0.66. If the braking power index is less than 1, a more effective performance of the brake system 1 can be concluded than was assumed in advance on definition of the conversion specification 37. If the braking power index is greater than 1, the performance of the brake system 1 is poorer.

In normal braking mode, current values 40 of the braking power index 34 are determined continually on further brakings. The braking power index 34 provided for the pressure control mode is adapted taking into account the current value 40 of the braking power index 34. On each braking therefore, the braking power index 34, which is provided for the pressure control mode 24, is adapted to be more refined, more precise and more informative. The braking power index 34 here takes into account external influences, difficult to determine, on the braking behaviour of the motor vehicle 2, for example the road surface but also the load state of the truck, which has a decisive effect on the braking behaviour, and changes in the coefficient of friction of the friction partners of the wheel brakes which are largely temperature-induced.

In further exemplary embodiments, not shown in FIG. 2, the influence on the determination of the vehicle deceleration z-Ist which results from a roadway slope of an uphill or downhill gradient is taken into account, in that the vehicle deceleration z-Ist, present at the start of braking by the driver of the motor vehicle, is detected as an offset value and taken into account accordingly in the determination of the braking power index 34.

As an alternative to taking into account an offset value, in a further exemplary embodiment, from the start of braking by the driver of the motor vehicle, the determination of the vehicle deceleration z-Ist is continually updated for the roadway slope influence, in that a change in roadway slope during braking is determined and taken into account in the determination of the vehicle deceleration z-Ist.

In pressure control mode 24, the driver brake request 19 or the value P-Soll representing the driver brake request 19—here a brake target pressure—is read, and in conversion step 33, linked to the provided braking power index 34 taking into account the conversion specification 37. Accordingly, the procedure is the reverse of that for determining the braking power index 34 in normal braking mode 18. The value representing the driver brake request 19 is linked—for example multiplied—with the previously adapted braking power index 34 representing the vehicle deceleration effect, such that the result is a driver target deceleration value z-int in the same dimension as the external target deceleration value z-ext. The linking taking into account the braking power index 34 is represented in the diagram in FIG. 2 by the linking element 32.

After linking of the driver target deceleration value z-int with the external target deceleration value z-ext by the linking element 32 into a resulting target deceleration value z-RES, a conclusion concerning the brake pressure P to be set is drawn from comparison of the resulting target deceleration value z-RES with the actual deceleration value z-Ist. Advantageously, the actual deceleration is regulated with a regulation circuit 41, and the actual deceleration z-Ist is tracked in the resulting target deceleration z-RES. For this, the control unit 21 comprises a regulation circuit 41, wherein in the regulation circuit 41, the actual deceleration value z-Ist is the controlled variable, the resulting target deceleration value z-RES is the command variable, and the brake pressure P is the correcting variable. The actual deceleration value z-Ist is regulated with the resulting target deceleration value z-RES as the command variable since, due to the adjustment measures by variation of the brake pressure, the actual deceleration value has a direct effect on itself. The actual deceleration value z-Ist with the resulting target deceleration value z-RES is here subjected to a target/actual value comparison 42 in the regulation circuit 41, and the result of the target/actual comparison 42 is predefined for a regulator 38 which performs a corresponding adjustment of the brake pressure P from the result of the target/actual comparison 42.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1. Brake system
2. Motor vehicle
3. Front axle
4. Rear axle
5. Wheel
6. Wheel brake
7. Brake cylinder
8. Spring accumulator
9. Brake pedal
10. Service brake valve
11. Brake line
12. Pressure medium store
13. First brake circuit
14. Second brake circuit
15. Second pressure medium store
16. Relay valve
17. Relay valve
18. Normal braking mode
19. Driver brake request
20. Pressure control valve
21. Control unit
22. Inlet valve
23. Outlet valve
24. Pressure control mode
25. 3/2-way directional control valve
26. Pressure line
27. Third pressure medium store
28. Twin check valve
29. Rotation speed sensor
30. External brake request
31. Mode detection step
32. Linking element
33. Conversion step
34. Braking power index
35. Memory
36. Determination step 37. Conversion specification
38. Regulator
39. Index determination step
40. Current value of 34
41. Regulation circuit
42. target/actual value comparison
43. Brake signal emitter
44. Brake line
45. Reference value
46. Reference deceleration value
47. Proportional amount
48. Relative scale
49. Division
50. Linking
51. Antilock braking system
52. Dynamic state variable
53. Measuring signal
54. Longitudinal acceleration sensor
P Brake pressure
P-Soll Value
z-Ist Actual deceleration value
z-int Driver target deceleration value
z-ext External target deceleration value
Z-RES Resulting target deceleration value

The invention claimed is:

1. A method for generating brake pressures at pneumatically operated wheel brakes of a motor vehicle, the method comprising:
generating, in a normal braking mode, first brake pressures at the pneumatically operated wheel brakes of the motor vehicle in response to reception of a first driver brake request;
determining, in the normal braking mode, a braking power index that relates a first driver target deceleration value corresponding to the first driver brake request and an actual deceleration value of a vehicle deceleration; and
generating, by a control unit in a pressure control mode, second brake pressures at the pneumatically operated wheel brakes of the motor vehicle
wherein the second brake pressures are generated in response to reception of an external brake request and a second driver brake request,
wherein the external brake request is defined for the control unit as an external target deceleration value and is independent of the second driver brake request,
wherein the second brake pressures are generated as a function of a resulting target deceleration value of the vehicle deceleration,
wherein the resulting target deceleration value is determined by linking, by the control unit, the external target deceleration value and a second driver target deceleration value corresponding to the second driver brake request, and
wherein the second driver target deceleration value is determined according to the braking power index.

2. The method as claimed in claim 1, wherein determining the braking power index comprises determining, using a predefined conversion specification, the driver target deceleration value corresponding to the first driver brake request and determining the actual deceleration value of the vehicle deceleration.

3. The method as claimed in claim 1, wherein the braking power index is a quotient of the first driver target deceleration value and the actual deceleration value of the first driver brake request.

4. The method as claimed in claim 2, wherein the predefined conversion specification comprises a predetermined driver brake request reference value and a reference deceleration value associated therewith,
wherein a proportion of the predetermined driver brake request that corresponds to the first driver brake request is determined, and
wherein a corresponding proportion of the reference deceleration value is determined, according to the conversion specification, as the first driver target deceleration value.

5. The method as claimed in claim 4, wherein, by the conversion specification, a specific proportion of the reference value of the driver brake request corresponding to a proportional amount of the reference deceleration is assigned to each of multiple values of the driver brake request.

6. The method as claimed in claim 2, wherein the second driver target deceleration value corresponding to the second driver brake request is determined using the braking power index and the second driver brake request.

7. The method as claimed in claim 6, wherein in the pressure control mode, the second driver target deceleration value is determined from a value representing the second driver brake request according to the predefined conversion specification.

8. The method as claimed in claim 1, wherein on further braking of the motor vehicle by the driver in normal braking mode, in each case current values of the braking power index are determined, and the braking power index provided for the pressure control mode is adapted taking into account the current value of the braking power index.

9. The method as claimed in claim 1, wherein the actual deceleration value is controlled or regulated with the resulting target deceleration value as a command variable.

10. The method as claimed in claim 1, wherein the control unit evaluates dynamic state variables of the wheels to be braked and determines the actual deceleration value therefrom.

11. The method as claimed in claim 10, wherein the actual deceleration value is determined based on dynamic state variables and the measurement signal of a longitudinal acceleration sensor.

12. The method as claimed in claim 1, wherein the control unit controls the brake pressure at each respective wheel brakes via a pressure control valve and connects a brake circuit of the each respective pressure control valves to a pressure medium store via operation of a respective actuation valve.

13. A brake system for generating brake pressures at pneumatically operated wheel brakes of a motor vehicle, the brake system comprising:
a control unit configured to control, for each pneumatically operated wheel brake, a pressure control valve;
a brake cylinder for each pneumatically operated wheel brake;
a service brake valve configured to be actuated by a driver of the motor vehicle; and
a brake signal emitter;
wherein, in a normal braking mode, brake pressures in each brake cylinder are configured to be set depending on actuation of the service brake valve by the driver,
wherein, in a pressure control mode, the brake pressures in each brake cylinder are configured to be set by the control unit via each respective pressure control valve,
wherein the control unit has a detector configured to detect an actual deceleration value, wherein the control unit is configured to determine, in the normal braking mode, a braking power index that relates a first driver target deceleration value corresponding to the first driver brake request and the detected actual deceleration value of a vehicle deceleration, wherein the control unit is configured to generate, in the pressure control mode, the brake pressures in each brake cylinder as a function of a resulting target deceleration value of the vehicle deceleration and in response to reception of an external brake request and a driver brake request, wherein the external brake request is defined for the control unit as an external target deceleration value and is independent of the driver brake request, wherein the resulting target deceleration value is determined by linking, by the control unit, the external target deceleration value and a driver target deceleration value corresponding to the driver brake request, and wherein the driver target deceleration value is determined according to the braking power index.

14. The brake system as claimed in claim 13, further comprising a regulation circuit configured to set the actual deceleration value, wherein in the regulation circuit, the actual deceleration value is a controlled variable, the resulting target deceleration value is a command variable, and the brake pressures in each brake cylinder are correcting variables, so that the actual deceleration value can be compared with the resulting target deceleration value.

15. The brake system as claimed in claim 13, wherein the control unit evaluates dynamic state variables of the wheels to be braked and on a presence of a blocking tendency, controls the brake pressure of certain wheel brakes in the pressure control mode.

16. The brake system as claimed in claim 13, wherein the pressure control valves are arranged in one or more brake circuits which can be connected via a respective actuation valve to a pressure medium store, wherein each actuation valve is electrically connected to the control unit and can be switched by the control unit, wherein the pressure control valves of the wheels of one axle of the motor vehicle are connected via a common brake circuit with an actuation valve to the pressure medium store.

17. A motor vehicle with a brake system as claimed in claim 13.

18. The method as claimed in claim 1, wherein linking, by the control unit, the external target deceleration value and the second driver target deceleration value corresponding to the second driver brake request comprises (i) adding the external target deceleration value and the second driver target deceleration value, or (ii) selecting a maximum deceleration value from the external target deceleration value and the second driver target deceleration value.

19. The brake system as claimed in claim 13, wherein linking, by the control unit, the external target deceleration value and the driver target deceleration value corresponding to the driver brake request comprises (i) adding the external target deceleration value and the driver target deceleration value, or (ii) selecting a maximum deceleration value from the external target deceleration value and the driver target deceleration value.

20. A method for generating brake pressures at pneumatically operated wheel brakes of a motor vehicle, the method comprising:

generating, in a normal braking mode, first brake pressures at the pneumatically operated wheel brakes of the motor vehicle in response to reception of a first driver brake request;

determining, in the normal braking mode, a braking power index that relates a first driver target deceleration value corresponding to the first driver brake request and an actual deceleration value of a vehicle deceleration; and generating, by a control unit in a pressure control mode, second brake pressures at the pneumatically operated wheel brakes of the motor vehicle wherein the second brake pressures are generated in response to reception of an external brake request and a second driver brake request, wherein the external brake request is defined for the control unit as an external target deceleration value and is independent of the second driver brake request, wherein the second brake pressures are generated as a function of a resulting target deceleration value of the vehicle deceleration, wherein the control unit determines the resulting target deceleration value based on the external target deceleration value and a second driver target deceleration value corresponding to the second driver brake request.

* * * * *